(12) United States Patent
Vogt

(10) Patent No.: US 9,303,702 B2
(45) Date of Patent: Apr. 5, 2016

(54) ANTI-COUNTER ROTATION DEVICE

(71) Applicant: Donald A Vogt, Cedar Rapids, IA (US)

(72) Inventor: Donald A Vogt, Cedar Rapids, IA (US)

( * ) Notice: Subject to any disclaimer, the term of this patent is extended or adjusted under 35 U.S.C. 154(b) by 16 days.

(21) Appl. No.: 14/477,180

(22) Filed: Sep. 4, 2014

(65) Prior Publication Data

US 2015/0061270 A1 Mar. 5, 2015

Related U.S. Application Data

(60) Provisional application No. 61/873,637, filed on Sep. 4, 2013.

(51) Int. Cl.
*B60S 9/00* (2006.01)
*B60S 9/02* (2006.01)
*F16D 41/16* (2006.01)
*F16D 41/02* (2006.01)
*B60S 9/06* (2006.01)
*F16D 41/12* (2006.01)

(52) U.S. Cl.
CPC ............... *F16D 41/16* (2013.01); *F16D 41/02* (2013.01); *B60S 9/06* (2013.01); *F16D 41/12* (2013.01)

(58) Field of Classification Search
CPC ............ B60S 9/08; B60S 9/14; B60P 3/1066; B66D 5/34
USPC .............. 280/762, 763.1, 764.1, 765.1, 766.1
See application file for complete search history.

(56) References Cited

U.S. PATENT DOCUMENTS

| 1,425,448 | A | * | 8/1922 | Carroll | B60B 15/26 280/762 |
|---|---|---|---|---|---|
| 3,024,042 | A | * | 3/1962 | Abolins | B60S 9/08 280/766.1 |
| 4,566,674 | A | * | 1/1986 | Ebey | B66D 1/06 254/345 |
| 7,021,659 | B2 | | 4/2006 | McGrew | |
| 7,407,151 | B2 | * | 8/2008 | Rabska | B60P 3/1066 254/325 |
| 2005/0285380 | A1 | * | 12/2005 | Stanczak | 280/763.1 |

* cited by examiner

*Primary Examiner* — Bryan Evans
(74) *Attorney, Agent, or Firm* — Simmons Perrine Moyer Bergman PLC

(57) ABSTRACT

The present invention is an anti-counter rotation device that includes a gear wheel and a latch. The gear wheel is attached to the shaft of a trailer landing gear. The base plate mounts the latch to the trailer landing gear and includes an axle. In a first position, the latch engages the gear and permits rotation of the shaft a first direction (e.g. clockwise (CW)), but prevents rotation of the shaft in the opposite or second direction (i.e. counter clockwise (CCW)). In a second position, the latch operates in an opposite manner; that is, the latch permits rotation in the second direction (i.e. CCW), but prevents rotation in the first direction (i.e. CW). The latch has a width sufficient to accommodate multiple horizontal positions of the crank handle or shaft. One or more spacers on the axle or base plate may be utilized to locate the latch in relation to the gear. A locking pin may be used to insure the spacers and latch remain on the axle.

11 Claims, 1 Drawing Sheet

ANTI-COUNTER ROTATION DEVICE

CLAIM OF PRIORITY

This application claims the benefit of U.S. provisional application No. 61/873,637, filed on Sep. 4, 2013, which is incorporated by reference.

FIELD OF THE INVENTION

The present invention relates to devices and methods of preventing counter rotation of a shaft and in particular devices and methods of preventing the counter rotation of a shaft used to raise or lower a trailer.

BACKGROUND OF THE INVENTION

Trailers in the trucking industry must be raised and lowered in order to mount or dismount a trailer from the cab. Trailers include a landing gear which acts to support the cab of the trailer when the trailer is not connected to a cab. Typically, an operator uses a crank handle connected to a shaft on the trailer landing gear to accomplish the raising or lowering of the trailer. While machine power may be utilized, the most cost effective method is to have the operator manually use the crank handle.

Necessarily, the movement of the crank handle will be against a force on the shaft. That is, to raise the trailer, the operator will push (or pull) on the crank handle to counteract the force of gravity pulling down on the trailer (i.e. the weight of the trailer). A number of devices may be used to give the operator a mechanical advantage in counteracting the weight of the trailer. In one system a ratchet on the crank handle is used, as seen in U.S. Pat. No. 7,021,659. However, none of these devices can eliminate the force needed to rotate the shaft. As the shaft is rotated, significant potential energy is stored in the trailer and trailer landing gear. If the crank shaft slips from the operator's grip, that potential energy will be released and cause the crank handle to spin about the shaft. This free wheeling counter rotation of the handle can be a significant danger to the operator with the potential to strike the operator, causing injury, loss of work, and increased operating costs for the trucking company. Because the mounting and dismounting of the trailer may need to be accomplished several times a day, any device that reduces the risk associated with this activity is potentially desirable.

The present invention overcomes one or more of these problems.

SUMMARY OF THE INVENTION

The present invention is an anti-counter rotation device that includes a gear wheel and a latch. The gear wheel is attached to the shaft of the trailer landing gear. The base plate mounts the latch to the trailer landing gear and includes an axle. In a first position, the latch engages the gear and permits rotation of the shaft a first direction (e.g. clockwise (CW)), but prevents rotation of the shaft in the opposite or second direction (i.e. counter clockwise (CCW)). In a second position, the latch operates in an opposite manner; that is, the latch permits rotation in the second direction (i.e. CCW), but prevents rotation in the first direction (i.e. CW). The latch has a width sufficient to accommodate multiple horizontal positions of the crank handle or shaft. One or more spacers on the axle or base plate may be utilized to locate the latch in relation to the gear. A locking pin may be used to insure the spacers and latch remain on the axle.

DETAILED DESCRIPTION

Figure 1:
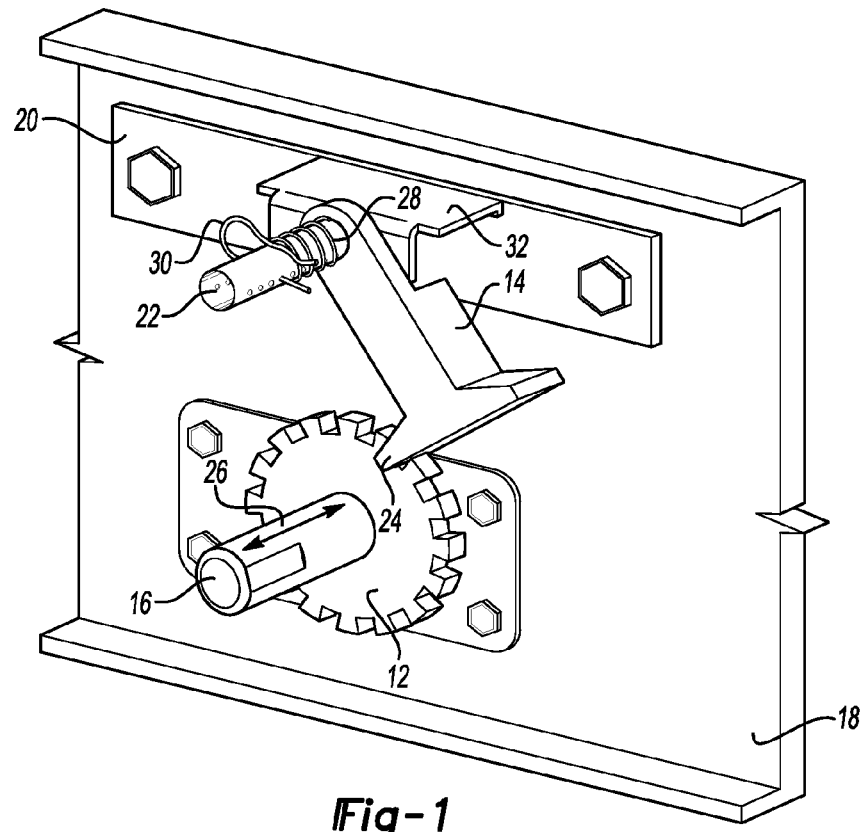
FIG. 1 shows an oblique view of one embodiment of the anti-counter rotation device of the present invention mounted on the underside of a trailer where the shaft and the crank shaft attach to a trailer landing gear.

The present invention is an anti-counter rotation device 10 that includes a gear 12 and a latch 14. In a first embodiment, the gear is a shaft gear fixedly attached to the outer diameter of a shaft 16 of a trailer landing gear 18. In this embodiment, a crank handle is connected to the shaft and is used to rotate the shaft which also rotates the shaft gear. The latch is mounted to the trailer landing gear, typically by way of a base plate 20, although this is not necessarily the case. The latch freely rotates about an axle 22.

In a first position, as shown in the figures, the latch, at the end distal from the axle, engages the shaft gear at an engaging portion 24 and permits rotation of the shaft (and gear) in a first direction (e.g. clockwise (CW)), but prevents rotation of the shaft in the opposite or second direction (i.e. counterclockwise (CCW)). In a second position, where the latch has been rotated around the axle, the latch operates in an opposite manner; that is, the engaging portion of the latch engages the shaft gear and permits the shaft and shaft gear to rotate in the second direction (i.e. CCW), but prevents rotation in the first direction (i.e. CW). By permitting rotation of the shaft in only one direction, the latch and gear device achieves the desired anti-counter rotation functionality.

The engaging portion of the latch is typically asymmetrical such that an engaging face of the engaging portion slips by or over the teeth of the gear as the gear is rotated. In contrast, a blocking face of the engaging portion is caught by the teeth of the gear and prevents the gear from rotating a significant distance in that direction.

Stated alternatively, the latch and shaft gear act as a ratcheting mechanism where the latch is the pawl to the gear. In a preferred embodiment, the teeth of the gear are uniform in shape and the engaging portion of the latch is asymmetrical in shape. This permits the latch to be moved between the first position and second position while maintaining the same functionality. However, the gear teeth may be asymmetrical when the engaging portion of the latch is symmetrical.

Known shafts on trailer landing gears may slide in and out along the axis of rotation of the shaft (shown by arrow 26). This is used to engage other gears to achieve varying degrees of mechanical advantage in raising or lowering the trailer when using the crank handle. Because the latch may be held in position relative to the trailer landing gear and the position of the shaft gear may change with the movement of the shaft, it desired that the latch has a width sufficient to accommodate multiple horizontal positions of the shaft gear. In another embodiment where the shaft gear is fixedly attached with a pair of gears (described) below, the movement of the shaft may not change the position of the gear relative to the latch. And thus the latch need not be substantially wider than the gear.

One or more spacers 28 on either side of the latch on the axle may be utilized to locate the latch in relation to the shaft gear and/or the trailer landing gear. A locking pin 30 may be used to insure the spacers and latch remain on the axle. In the alternative, one or more spacers may be used to help locate the shaft gear in relation to the latch.

The shaft gear is fixedly attached to the outer diameter of the shaft, so that as the shaft rotates so does the gear. The attachment of the gear to the shaft may be permanent (such as by welding) or temporary (such as by bolts or screws). In another embodiment, the shaft gear is attached to the shaft by a pair of gears; an external gear on the shaft and an internal gear on the gear. With the pair of gears, the shaft may be moved to selectively engage the gear. If the external gear on the is longer than the internal gear on the shaft gear, then the shaft may be moved (i.e. slid in or out) while the shaft gear remains in the same position relative to the latch.

The diameter and width of the shaft gear are such that the teeth will withstand a shock of striking the latch when the shaft (and by extension, the crank handle) is free wheeling. The number of teeth on the gear is selected so that the distance that the crank handle can free wheel is limited; preferably, the gear has at least 12 teeth. The size and shape of the teeth are also selected to improve the ability of the gear and latch to engage and to limit the free wheeling distance of the crank handle. In one embodiment, the teeth on the shaft gear are flat topped or include a flat top land. The material of the gear or teeth needs to be able to withstand striking the latch when the crank is free wheeling.

The latch resides on an axle attached to the trailer landing gear, where the axle acts as pivot point around which the latch can travel. In the depicted embodiment, the axle is held in place by a base plate that is bolted to the trailer landing gear. The base plate may also be welded or otherwise fixed to the trailer landing gear. In this embodiment, a base spacer separates the axle from the base plate and/or trailer landing gear. In this manner, the base spacer 32 is used to put distance between the axle and the trailer landing gear. This is desired where the trailer landing gear incorporates angle iron or other material that may interfere or prevent the rotation of the latch over top of the axle. The latch may also be swung under the axle to switch the direction of operation; this may require that the latch be shifted along the length of the axle to disengage it from the shaft gear before re-engaging it so as to permit the opposite rotation.

The material of the latch needs to be able to withstand striking the gear when the crank handle or shaft are free wheeling. As mentioned above, the sliding movement of the shaft may cause shaft gear to will move relative to the latch. For this reason, the width of the latch may be selected so that it will continue to engage the gear, regardless of which position the shaft is in. Also, a wider latch will increase the overall weight of the latch so that gravity will encourage the latch to engage with the shaft gear. An increased weight for the latch will mean that the latch is more likely to quickly engage with the gear and less likely to skip over several teeth before engaging the gear. The increased weight also help the latch remain engaged with the gear when the trailer is traveling. In other embodiments, another force is used to encourage the engagement of the latch with the gear such as a force provided by a spring or a force provided by an electromagnet.

In a second embodiment, the relative positions of the latch and gear are reversed. That is, the latch is fixedly attached to the outer diameter of the shaft, while an outer gear is around the latch. This embodiment may be called a ratcheting freewheel device. The outer gear includes an internal gear with the teeth of the gear located on the inner surface of a circular gear. The latch engages the inward facing teeth of the gear to act as the pawl for the ratchet mechanism. Here the latch may use a spring-loaded force to cause it to engage the gear. The shape of the engaging portion of the latch and the gear teeth are such that rotation in a single direction is allowed. For this embodiment to permit rotation in the opposite direction, a second outer gear and latch combination may be needed. The pair of gears may be housed in a gearbox that is attached to the trailer landing gear.

The particular outer gear may be selected by sliding the crank handle and/or the shaft in or out relative to the trailer landing gear (e.g. through the use of a pair of gears where the shaft engages the latch). In this manner, the shaft may be moved from engaging one latch to engaging the other latch.

Figure 2:
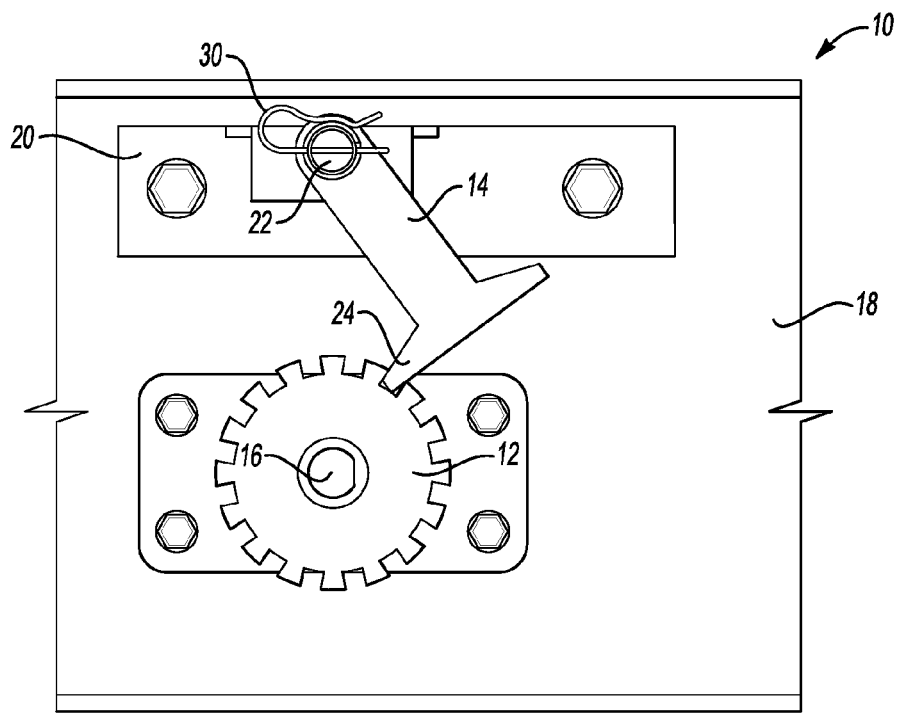
FIG. 2 shows a plan view of one embodiment of the anti-counter rotation device of the present invention.

The present invention also includes method of preventing crank handles from free wheeling for significant distances and methods of preventing uncontrolled counter rotation of shafts or crank handles. The anti-counter rotation device maybe used in either of two positions. As seen in FIG. 2, the latch is in the first position such that the shaft is permitted to rotate in the CW direction, but prevents rotation of the shaft in the CCW direction. The latch is rotated about the axle to place it in the second position. In the second position, the shaft is permitted to rotate in the CCW direction, but prevented from rotating in the CW direction. To allow for the latch to operate in both the first and second positions, the shaft and the axle are generally vertically aligned.

It will be further appreciated that functions or structures of a plurality of components or steps may be combined into a single component or step, or the functions or structures of one-step or component may be split among plural steps or components. The present invention contemplates all of these combinations. Unless stated otherwise, dimensions and geometries of the various structures depicted herein are not intended to be restrictive of the invention, and other dimensions or geometries are possible. Words such as 'above', 'below', 'top', 'bottom', 'first direction', 'second direction', etc. are not intended to be restrictive, but rather help illustrate the positions or movement of one or more components relative to other components. Furthermore, when two components are described as attached to one another, such attachments may be direct or indirect so that additional components or structure help make the connection between the two components described as being attached. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention. The present invention also encompasses intermediate and end products resulting from the practice of the methods herein. The use of "comprising" or "including" also contemplates embodiments that "consist essentially of" or "consist of" the recited feature.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes.

What is claimed is:

1. A device comprising:
   a ratcheting mechanism comprising a gear and a latch, wherein the gear is fixed to a shaft on a trailer landing gear and wherein the latch is rotatable around an axle that is attached to the trailer landing gear, wherein an engaging portion of the latch is shaped, combined with the shape of the teeth of the gear, to permit rotation of the shaft in single direction at a time, wherein the latch has a width sufficient to accommodate multiple horizontal positions of the shaft, and wherein the latch and gear prevent a crank handle attached to the shaft from freewheeling.

2. The device of claim 1 wherein the axle is attached to trailer landing gear via a base plate.

3. The device of claim 1 wherein one or more spacers are used on the axle to locate the latch relative to the shaft gear.

4. The device of claim 1 wherein the engaging portion of the latch is substantially wider than the thickness of the shaft gear.

5. A device for preventing counter rotation of a crank handle, comprising:

a ratcheting mechanism comprising a gear and a latch, wherein at least one of the gear or latch is fixed to a shaft on a trailer landing gear, and wherein an engaging portion of the latch is shaped, combined with the shape of the teeth of the gear, to permit rotation of a crank handle connected to the shaft in one direction and to prevent counter-rotation of the shaft and crank handle wherein the latch has a width sufficient to accommodate multiple horizontal positions of the shaft.

6. A method of preventing a crank handle from free wheeling, comprising:

engaging an engaging portion of a latch to a gear, wherein the latch or gear is fixed to a shaft of a landing gear, and wherein the engaging portion of the latch and the gear combine to permit the shaft to move in a rotation direction wherein the latch has a width sufficient to accommodate multiple horizontal positions of the shaft; and rotating the shaft through the use of a crank handle in the rotation direction to raise or lower a trailer landing gear, and blocking movement of the shaft in an anti-rotation direction.

7. The method of claim 6 wherein a blocking face of the engaging portion prevents the movement of the shaft in the anti-rotation direction.

8. The method of claim 6 wherein the blocking step occurs before the shaft has moved more than 90° in the anti-rotation direction.

9. The device of claim 1 wherein the direction of permitted rotation of the shaft is selectable by rotating the latch around the axle.

10. The device of claim 5 wherein the direction of permitted rotation of the shaft is selectable by a crank handle operator.

11. The method of claim 6 wherein the rotation direction is selectable by a crank handle operator.

* * * * *